US012718984B2

(12) United States Patent
Chun et al.

(10) Patent No.: US 12,718,984 B2
(45) Date of Patent: Aug. 25, 2026

(54) MULTILAYER CERAMIC CAPACITOR INCLUDING SILICON, DYSPROSIUM, AND TERBIUM, AND MANUFACTURING METHOD OF THE MULTILAYER CERAMIC CAPACITOR

(71) Applicant: SAMSUNG ELECTRO-MECHANICS CO., LTD., Suwon-si (KR)

(72) Inventors: Heesun Chun, Suwon-si (KR); Minhee Kim, Suwon-si (KR); Gil Seong Kang, Suwon-si (KR); Sun-Min Jung, Suwon-si (KR); Yongjun Gong, Suwon-si (KR); Ji Young Lee, Suwon-si (KR); Kimyoung Yun, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 107 days.

(21) Appl. No.: 18/743,928

(22) Filed: Jun. 14, 2024

(65) Prior Publication Data

US 2025/0157732 A1 May 15, 2025

(30) Foreign Application Priority Data

Nov. 14, 2023 (KR) ........................ 10-2023-0156994

(51) Int. Cl.
*H01G 4/12* (2006.01)
*H01G 4/30* (2006.01)

(52) U.S. Cl.
CPC ............ *H01G 4/1227* (2013.01); *H01G 4/30* (2013.01)

(58) Field of Classification Search
CPC ............................... H01G 4/30; H01G 4/1227
See application file for complete search history.

(56) References Cited

U.S. PATENT DOCUMENTS 11,636,979 B2 * 4/2023 Chun .................... H01G 4/012 361/321.2
11,776,750 B2 * 10/2023 Chun .................. H01G 4/1218 361/321.4

(Continued)

FOREIGN PATENT DOCUMENTS

JP 2020-136663 A 8/2020
KR 10-2013-0075091 A 7/2013

(Continued)

OTHER PUBLICATIONS

Office Action dated Aug. 26, 2024, issued in corresponding Korean Patent Application No. 10-2023-0156994 with a English Machine translation.

(Continued)

*Primary Examiner* — David M Sinclair
(74) *Attorney, Agent, or Firm* — Morgan, Lewis & Bockius LLP

(57) ABSTRACT

A multilayer ceramic capacitor may include a capacitor body including a dielectric layer and an internal electrode layer, and an external electrode disposed outside the capacitor body, where the dielectric layer may include a plurality of dielectric grains and a grain boundary located between the dielectric grains adjacent to each other, where the dielectric grain may include a barium titanate-based main component including barium (Ba) and titanium (Ti), where the grain boundary includes silicon (Si), dysprosium (Dy), and terbium (Tb), and where silicon (Si), dysprosium (Dy), and terbium (Tb) are included in the grain boundary in content order of terbium (Tb)<dysprosium (Dy)<silicon (Si).

20 Claims, 7 Drawing Sheets

(56) References Cited

U.S. PATENT DOCUMENTS

| | | | | |
|---|---|---|---|---|
| 2009/0207551 | A1* | 8/2009 | Suzuki | C04B 35/49 501/137 |
| 2013/0162100 | A1 | 6/2013 | Kang et al. | |
| 2014/0318844 | A1* | 10/2014 | Kim | H01G 4/30 361/301.4 |
| 2015/0287535 | A1* | 10/2015 | Nakanishi | H01G 4/1227 361/301.4 |
| 2016/0118188 | A1* | 4/2016 | Wada | C04B 35/4682 29/25.42 |
| 2017/0178808 | A1* | 6/2017 | Shimada | C04B 35/64 |
| 2019/0135701 | A1* | 5/2019 | Yun | H01G 4/1236 |
| 2020/0251242 | A1* | 8/2020 | Kwon | H01G 4/1227 |
| 2020/0258684 | A1 | 8/2020 | Yun et al. | |
| 2022/0270822 | A1 | 8/2022 | Baik et al. | |
| 2022/0399165 | A1 | 12/2022 | Kim et al. | |

FOREIGN PATENT DOCUMENTS

| | | | |
|---|---|---|---|
| KR | 10-1836194 | B1 | 3/2018 |
| KR | 10-2020-0096019 | A | 8/2020 |
| KR | 10-2022-0121024 | A | 8/2022 |
| KR | 10-2022-0167599 | A | 12/2022 |

OTHER PUBLICATIONS

Office Action issued on Jan. 12, 2026 in Korean Patent Application No. 10-2023-0156994 with English translation.

Korean Office Action dated Apr. 21, 2025 issued in Korean Patent Application No. 10-2023-0156994 (with English translation).

* cited by examiner

MULTILAYER CERAMIC CAPACITOR INCLUDING SILICON, DYSPROSIUM, AND TERBIUM, AND MANUFACTURING METHOD OF THE MULTILAYER CERAMIC CAPACITOR

CROSS-REFERENCE TO RELATED APPLICATION

This application claims priority to and the benefit of Korean Patent Application No. 10-2023-0156994 filed in the Korean Intellectual Property Office on Nov. 14, 2023, the entire contents of which is incorporated herein by reference.

BACKGROUND

(a) Technical Field

The present disclosure relates to a multilayer ceramic capacitor and a manufacturing method thereof.

(b) Description of the Related Art

As electronic components using a ceramic material, there are a capacitor, an inductor, a piezoelectric element, a varistor, a thermistor, and the like. Among ceramic electronic components, a multilayer ceramic capacitor (MLCC) may be used in various electronic devices due to advantages such as a small size, a high capacitance, an easy mounting feature, and the like.

For example, a multilayer ceramic capacitor (MLCC) may be used in a chip type condenser mounted on a board of several electronic products such as image devices, for example, liquid crystal displays (LCD), plasma display panels (PDP), or the like, computers, personal portable terminals, smartphones, and the like, to serve to charge or discharge electricity therein or therefrom.

In particular, as demand for ultra-small, high-capacity MLCCs for IT is increasing, high reliability is required under ultra-thin design.

SUMMARY

An embodiment attempts to provide a multilayer ceramic capacitor having excellent density and thin-layer reliability.

Another embodiment attempts to provide a manufacturing method of a multilayer ceramic capacitor.

A multilayer ceramic capacitor may include a capacitor body including a dielectric layer and an internal electrode layer, and an external electrode disposed outside the capacitor body, where the dielectric layer may include a plurality of dielectric grains and a grain boundary located between dielectric grains adjacent to each other, where the plurality of dielectric grains may include a barium titanate-based main component including barium (Ba) and titanium (Ti), where the grain boundary includes silicon (Si), dysprosium (Dy), and terbium (Tb), and where a content of each of silicon (Si), dysprosium (Dy), and terbium (Tb) included in the grain boundary is in order of terbium (Tb)<dysprosium (Dy)<silicon (Si).

A sum of the contents of dysprosium (Dy) and terbium (Tb) may be greater than 0.9 parts by mole to less than 2.0 parts by mole based on 100 parts by mole of titanium (Ti).

Silicon (Si) may be included in an amount of 1.3 parts by mole to 2.5 parts by mole based on 100 parts by mole of titanium (Ti).

Dysprosium (Dy) may be included in an amount of 0.6 parts by mole to 1.6 parts by mole based on 100 parts by mole of titanium (Ti).

Terbium (Tb) may be included in an amount of 0.1 parts by mole to 0.5 parts by mole based on 100 parts by mole of titanium (Ti).

A mole ratio of terbium (Tb) to dysprosium (Dy) may be 0.3 to 0.8.

An atomic ratio of dysprosium (Dy) to silicon (Si) may be greater than 0.4 to less than 1.0.

An atomic ratio of terbium (Tb) to silicon (Si) may be greater than 0.4 to less than 1.0.

The grain boundary may further include tin (Sn).

Tin (Sn) may be included in an amount of 0.5 parts by mole to 2.5 parts by mole based on 100 parts by mole of titanium (Ti).

A dielectric grain among the plurality of dielectric grains may have a diameter of 60% to 90% of a sum of a diameter of the dielectric grain and a thickness of the grain boundary.

A diameter of a dielectric grain among the plurality of dielectric grains may be 80 nm to 120 nm.

A size D50 of the plurality of dielectric grains may be 300 nm or less.

A thickness of the grain boundary may be 10 nm to 100 nm.

An average thickness of the dielectric layer may be 0.3 μm to 0.6 μm.

Silicon (Si) may be included in an amount of 1.3 parts by mole to 2.5 parts by mole based on 100 parts by mole of titanium (Ti), dysprosium (Dy) may be included in an amount of 0.6 parts by mole to 1.6 parts by mole based on 100 parts by mole of titanium (Ti), and terbium (Tb) may be included in an amount of 0.1 parts by mole to 0.5 parts by mole based on 100 parts by mole of titanium (Ti).

A manufacturing method of a multilayer ceramic capacitor may include preparing a dielectric slurry by mixing barium titanate-based main component powder, and secondary component powder including silicon (Si)-containing compound, dysprosium (Dy)-containing compound, and terbium (Tb)-containing compound, preparing a dielectric green sheet by utilizing the dielectric slurry, and forming a conductive paste layer on a surface of the dielectric green sheet, manufacturing a dielectric green sheet laminate by stacking a plurality of the dielectric green sheets on which the conductive paste layer is formed, manufacturing a capacitor body including a plurality of dielectric layers and a plurality of internal electrode layers by firing the dielectric green sheet laminate, and forming an external electrode on a first surface of the capacitor body, where the dielectric layer may include a plurality of dielectric grains and a grain boundary located between dielectric grains adjacent to each other, where the plurality of dielectric grains may include a barium titanate-based main component including barium (Ba) and titanium (Ti), where the grain boundary includes silicon (Si), dysprosium (Dy), and terbium (Tb), and where a content of each of silicon (Si), dysprosium (Dy), and terbium (Tb) included in the grain boundary is in order of terbium (Tb)<dysprosium (Dy)<silicon (Si).

The barium titanate-based main component powder may be prepared by mixing titanium (Ti) precursor and barium (Ba) precursor, where, based on 100 parts by mole of the titanium (Ti) precursor, the silicon (Si)-containing compound may be included in an amount of 1.3 parts by mole to 2.5 parts by mole, the dysprosium (Dy)-containing compound is included in an amount of 0.6 parts by mole to 1.6 parts by mole, and the terbium (Tb)-containing compound may be included in an amount of 0.1 parts by mole to 0.5 parts by mole.

The secondary component powder may further include a fourth compound including tin (Sn).

The barium titanate-based main component powder is prepared by mixing titanium (Ti) precursor and barium (Ba) precursor, and the fourth compound may be included in an amount of 0.5 parts by mole to 2.5 parts by mole based on 100 parts by mole of the titanium (Ti) precursor.

A multilayer ceramic capacitor according to an embodiment may improve density and thin-layer reliability by strengthening the reliability of the dielectric grain boundary surface and the reliability of the interface between the dielectric layer and the internal electrode layer.

DETAILED DESCRIPTION

Figure 1:
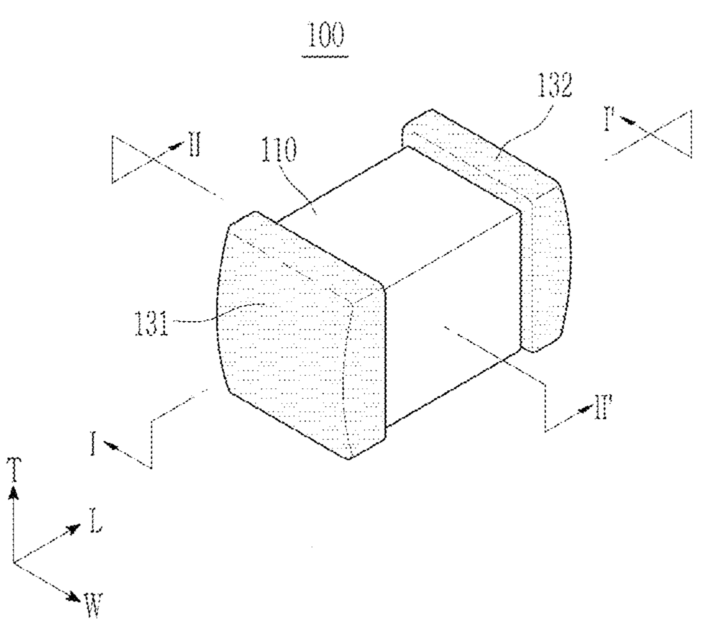
FIG. 1 is a perspective view showing a multilayer ceramic capacitor according to an embodiment.

Hereinafter, the present disclosure will be described in detail hereinafter with reference to the accompanying drawings, in which embodiments of the present disclosure are shown. The drawings and description are to be regarded as illustrative in nature and not restrictive. Like reference numerals designate like elements throughout the specification. In the accompanying drawings, some components are exaggerated, omitted, or schematically illustrated, and the size of each component does not entirely reflect the actual size.

The accompanying drawings are intended only to facilitate an understanding of the exemplary embodiments disclosed in this specification, and it is to be understood that the technical ideas disclosed herein are not limited by the accompanying drawings and include all modifications, equivalents, or substitutions that are within the range of the ideas and technology of the present disclosure.

Although terms of "first," "second," and the like are used to explain various components, the components are not limited to such terms. These terms are only used to distinguish one component from another component.

In addition, it will be understood that when an element such as a layer, film, region, or substrate is referred to as being "on" another element, it can be directly on the other element or intervening elements may also be present. In contrast, when an element is referred to as being "directly on" another element, there are no intervening elements present. Further, when an element is referred to as being "on" or "above" a reference element, it can be positioned above or below the reference element, and it is not necessarily referred to as being positioned "on" or "above" in a direction opposite to gravity.

Throughout the specification, the terms "comprise" or "have" are intended to specify the presence of stated features, integers, steps, operations, components, components or a combination thereof, but do not preclude the presence or addition of one or more other features, integers, steps, operations, components, components, and/or groups thereof. Therefore, unless explicitly described to the contrary, the word "comprise" and variations such as "comprises" or "comprising" will be understood to imply the inclusion of stated elements but not the exclusion of any other elements.

Further, throughout the specification, the phrase "in a plan view" or "on a plane" means viewing a target portion from the top, and the phrase "in a cross-sectional view" or "on a cross-section" means viewing a cross-section formed by vertically cutting a target portion from the side.

Throughout the specification, the term "connected" does not mean only that two or more constituent components are directly connected, but may also mean that two or more constituent components are indirectly connected through another constituent component, that two or more components are electrically connected as well as physically connected, or that two or more constituent components are referred to by different names but are united by location or function.

Hereinafter, a multilayer ceramic capacitor according to an embodiment will be described with reference to FIG. 1 to FIG. 3.

FIG. 1 is a perspective view showing a multilayer ceramic capacitor according to an embodiment. FIG. 2 is a cross-sectional view of a multilayer ceramic capacitor taken along line I-I' in FIG. 1. FIG. 3 is a cross-sectional view of a multilayer ceramic capacitor taken along line II-II' in FIG. 1.

Figure 2:
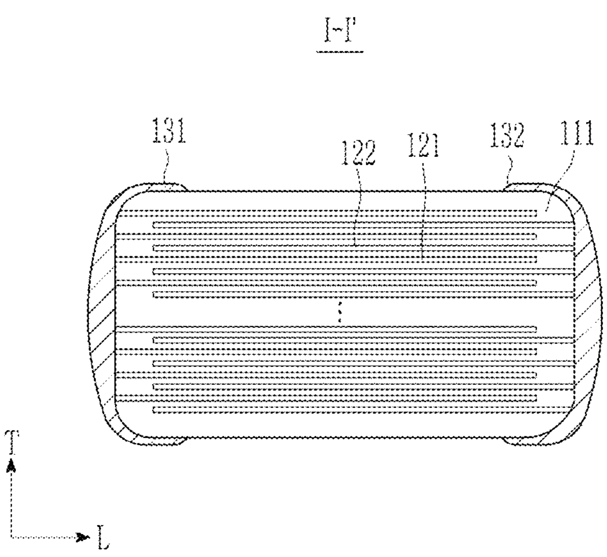
FIG. 2 is a cross-sectional view of a multilayer ceramic capacitor taken along line I-I' in FIG. 1.
Figure 3:
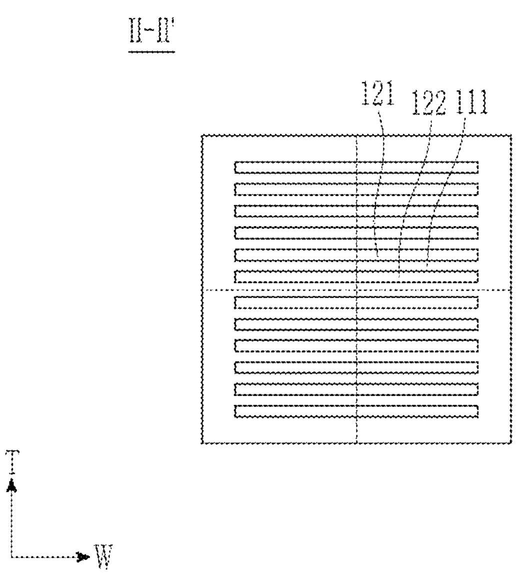
FIG. 3 is a cross-sectional view of a multilayer ceramic capacitor taken along line II-II' in FIG. 1.

A L-axis, a W-axis, and a T-axis shown in FIG. 1 to FIG. 3 represent a length direction, a width direction, and a thickness direction of a capacitor body 110, respectively. Here, the thickness direction (a T-axis direction) may be a direction perpendicular to the wide surface (main surface) of the sheet-shaped components, and may be used as the same concept as a stacking direction in which a dielectric layer 111 are stacked, for example. The length direction (a L-axis direction) may be a direction extending parallel to the wide surface (main surface) of the sheet-shaped components, and may be approximately perpendicular to the thickness direction (the T-axis direction). For example, the length direction (L-axis direction) may be the direction in which an external electrode 131 and a second external electrode 132 are positioned. The width direction (a W-axis direction) may be a direction extending parallel to the wide surface (main surface) of the sheet-shaped components, and may be approximately perpendicular to the thickness direction (T-axis direction) and the length direction (the L-axis direction). The length of the sheet-shaped components in the length direction (L-axis direction) may be longer than the length in the width direction (W-axis direction).

Referring to FIG. 1 to FIG. 3, a multilayer ceramic capacitor 100 according to an embodiment includes the capacitor body 110 and external electrodes 131 and 132 disposed outside the capacitor body 110. The external electrodes 131 and 132 may include a first external electrode 131 and the second external electrode 132 disposed at opposite ends of the capacitor body 110 in the length direction (the L-axis direction).

For example, the capacitor body 110 may have a roughly hexahedral shape.

For convenience of description of an embodiment, the two surfaces opposing each other in the thickness direction (T-axis direction) of the capacitor body 110 are referred to as first and second surfaces, the two surfaces connected to the first and second surfaces and opposing each other in the length direction (L-axis direction) are referred to as third and fourth surfaces, and two surfaces connected to the first and second surfaces and to the third and fourth surfaces, and opposing each other in the width direction (W-axis direction) are referred to as fifth and sixth surfaces.

As an example, a first surface, which is the lower surface, may be a surface facing the mounting direction. Additionally, the first to the sixth surfaces may be flat, but the embodiment is not limited thereto. For example, the first to the sixth surfaces may be curved surfaces with a convex central portion, and the edges, which are the boundaries of each surface, may be rounded.

The shape and size of the capacitor body 110 and the number of stacks of the dielectric layers 111 are not limited to those shown in the drawings of the embodiment.

The capacitor body 110 includes a plurality of dielectric layers 111 and internal electrode layers 121 and 122. Specifically, the capacitor body 110 includes the plurality of dielectric layers 111 and a first internal electrode 121 and a second internal electrode 122 alternately arranged in the thickness direction (T-axis direction) interposing the dielectric layer 111.

At this time, the boundaries between adjacent dielectric layers 111 of the capacitor body 110 may be integrated to the extent that it is difficult to check without using a scanning electron microscope (SEM).

The capacitor body 110 may have the active region. The active region is a region in which the dielectric layer 111 and the internal electrode layers 121 and 122 are alternately arranged, and contributes to forming capacity of the multilayer ceramic capacitor 100. Specifically, the active region may be a region where the first internal electrode 121 or the second internal electrode 122 stacked along the thickness direction (T-axis direction) overlap.

In addition, the capacitor body 110 may further include a cover portion and a side margin portion.

The cover region is the thickness direction marginal portion, and may be located on the first and second surfaces of the active region in the thickness direction (the T-axis direction), respectively. This the cover portion may be a single the dielectric layer 111 or two or more dielectric layers 111 stacked on the upper and lower surfaces of the active region, respectively.

The side margin portion may be considered as a side surface cover portion, and may be located on side portions of the active region facing each other in the width direction (W-axis direction), i.e., the fifth and sixth surfaces. The side margin region may be formed according as, when the conductive paste layer for the internal electrode is applies on a surface of a dielectric green sheet, the dielectric green sheets, which are applied with the conductive paste layer only in a partial region of the surface of the dielectric green sheet and not applied with the conductive paste layer on both side surfaces of the surface of the dielectric green sheet, are stacked and then fired, but it is not limited thereto.

The cover region and the side marginal portion 140 serve to prevent damage to the first internal electrode 121 and the second internal electrode 122 due to physical or chemical stress.

The dielectric layer 111 according to an embodiment is described with reference to FIG. 4.

Figure 4:
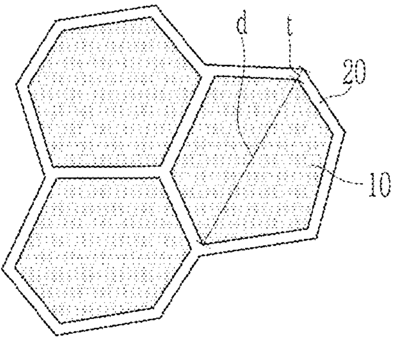
FIG. 4 is a schematic diagram showing dielectric grains and grain boundaries within a dielectric layer according to an embodiment.

FIG. 4 is a schematic diagram showing dielectric grains and grain boundaries within a dielectric layer according to an embodiment.

Referring to FIG. 4, the dielectric layer 111 according to an embodiment includes a plurality of dielectric grains 10 and a grain boundary 20 located between the dielectric grains 10 adjacent to each other.

The dielectric grain 10 includes barium titanate-based main component including barium (Ba) and titanium (Ti).

The barium titanate-based main ingredient is a dielectric base material, has a high dielectric constant, and contributes to forming the dielectric constant of the multilayer ceramic capacitor 100.

A barium titanate-based main component may include for example $BaTiO_3$, $Ba(Ti,Zr)O_3$, $Ba(Ti,Sn)O_3$, $(Ba,Ca)TiO_3$, $(Ba,Ca)(Ti,Ca)O_3$, $(Ba,Ca)(Ti, Zr)O_3$, $(Ba,Ca)(Ti,Sn)O_3$, $(Ba,Sr)TiO_3$, $(Ba,Sr)(Ti,Zr)O_3$, $(Ba,Sr)(Ti,Sn)O_3$, or a combination thereof.

The grain boundary 20 may include silicon (Si), dysprosium (Dy), and terbium (Tb), and may have a wall shape.

The components existing in the grain boundary 20 may be a secondary component employed in the barium titanate-based main component, which is the dielectric base material.

It is generally known that in order to improve reliability, the grain size must be small and the number of dielectrics in the dielectric layer must be large. In addition, reliability characteristics is achieved through control of the addition amounts of additives, that is, transition metal elements of fixed-valence acceptor and variable-valence acceptor, and rare earth elements that serve as donors and optimization of composition ratio. However, even if the same additive composition is used, completely different reliability characteristics may be exhibited depending on the dispersibility state and arranged form of the additives within the dielectric material.

According to an embodiment, since components of silicon (Si), dysprosium (Dy), and terbium (Tb) exist in the grain boundary 20, not only interface reliability between the dielectric grains 10 but also the interface reliability between the dielectric layer and the internal electrode layer may be strengthened. The above components are a secondary component employed in the barium titanate-based main component that is the dielectric base material, and concentration phenomenon of the components to the interface may be induced through the control of a employed depth. Accordingly, when the components of Si, Dy, and Tb exist in the grain boundary 20 located in the interface between the dielectric grains 10, since the interface reliability is strengthened, a multilayer ceramic capacitor having excellent density and high thin-layer reliability may be secured.

Silicon (Si) may strengthen interfacial resistance by increasing Schottky barrier of the interface by existing in the grain boundary 20. Dysprosium (Dy) and terbium (Tb) are rare earth elements, and may improve high temperature accelerated lifetime and reliability.

The components may be included in a content order of terbium (Tb)<dysprosium (Dy)<silicon (Si) in the grain boundary 20. Silicon (Si), dysprosium (Dy), and terbium (Tb) are included in the above content order in the grain boundary 20, not only the interface reliability between the dielectric grains 10 but also the interface reliability between the dielectric layer and the internal electrode layer is strengthened, and density and thin-layer reliability may be improved.

In more detail, sum of the contents of dysprosium (Dy) and terbium (Tb) may be greater than 0.9 parts by mole to less than 2.0 parts by mole, for example, 1.0 parts by mole to 1.9 parts by mole, based on 100 parts by mole of titanium (Ti). When the sum of the contents of dysprosium (Dy) and terbium (Tb) is within the above range, as the interface reliability is strengthened, density and thin-layer reliability of a multilayer ceramic capacitor may be improved.

Silicon (Si) may be included in an amount of 1.3 parts by mole to 2.5 parts by mole, for example 1.35 parts by mole to 2.40 parts by mole, for example 1.35 parts by mole to 2.25 parts by mole, based on 100 parts by mole of titanium (Ti). When silicon (Si) is included within the above the content range in the grain boundary 20, the interface reliability may be strengthened, density control may become easy, a high dielectric constant may be secured, and thereby density and thin-layer reliability of a multilayer ceramic capacitor may be improved.

Dysprosium (Dy) may be included in an amount of 0.6 parts by mole to 1.6 parts by mole, for example 0.7 parts by mole to 1.5 parts by mole, for example 0.80 parts by mole to 1.45 parts by mole, based on 100 parts by mole of titanium (Ti). When dysprosium (Dy) is included within the above content range in the grain boundary 20, it provides appropriate level of electron emission as a donor, a phenomenon that excess electrons emitted when employed in the dielectric base material combine with oxygen vacancies to obstacle movement of oxygen defects movement does not occur, the interface reliability is strengthened, and thus a multilayer ceramic capacitor having excellent density and thin-layer reliability may be secured.

Terbium (Tb) may be included in an amount of 0.1 parts by mole to 0.5 parts by mole, for example 0.20 parts by mole to 0.48 parts by mole, based on 100 parts by mole of titanium (Ti). When terbium (Tb) is included within the content range in the grain boundary 20, the appropriate level of electron emission is enabled as a donor, the interface reliability may be strengthened, and thus a multilayer ceramic capacitor having excellent density and thin-layer reliability may be secured.

A mole ratio of terbium (Tb) to dysprosium (Dy) may be 0.3 to 0.8, for example, 0.31 to 0.60. When the mole ratio of terbium (Tb) to dysprosium (Dy) is within the above range, the interface reliability may be strengthened, and thus a multilayer ceramic capacitor having excellent density and thin-layer reliability may be secured.

An atomic ratio of dysprosium (Dy) to silicon (Si) may be greater than 0.4 to less than 1.0. When the atomic ratio of dysprosium (Dy) to silicon (Si) is within the above range, as the interface reliability is strengthened, density and thin-layer reliability of a multilayer ceramic capacitor may be improved.

An atomic ratio of terbium (Tb) to silicon (Si) may be greater than 0.4 to less than 1.0. When the atomic ratio of terbium (Tb) to silicon (Si) is within the above range, as the interface reliability is strengthened, density and thin-layer reliability of a multilayer ceramic capacitor may be improved.

The grain boundary 20 may further include tin (Sn). Since tin (Sn) exists in the grain boundary 20, low temperature density and effective capacity therefrom may be increased.

Tin (Sn) may be included in an amount of 0.5 parts by mole to 2.5 parts by mole, for example 0.7 parts by mole to 2.3 parts by mole, based on 100 parts by mole of titanium (Ti). When tin (Sn) is included within the above range in the grain boundary 20, low temperature density and effective capacity therefrom may be increased, and reliability may be improved.

The existence of the grain boundary 20 and the contents of the Si, Dy, Tb, and Sn in the grain boundary 20 may be confirmed by transmission electron microscope-energy dispersive spectroscopy (TEM-EDS) analysis.

In more detail, a cross-section sample may be obtained such that the active region where the dielectric layer 111 and the internal electrode layers 121 and 122 overlap may be observed, as the multilayer ceramic capacitor 100 is placed into epoxy mixture liquid and cured, the W-axis and T-axis direction surface (WT surface) of the capacitor body 110 is polished to a depth of ½ in the L-axis direction, and then the multilayer ceramic capacitor 100 is fixed and maintained in a vacuum atmosphere chamber. Subsequently, the active region of the cross-section sample may be measured by using transmission electron microscope (TEM). The transmission electron microscopy may be performed under the condition of acceleration voltage 200 kV and analysis magnification 225 k times by using focused ion beam (Xe-FIB), and may be measured such that at least one layer, for example 1 layer to 10 layers of the dielectric layer 111 may be visible. Subsequently, in a transmission electron microscope (TEM) image of the measured cross-section sample, by the EDS analysis, it may be confirmed that the grain boundary 20 exists and has a thickness, and the contents of Si, Dy, Tb, and Sn in the grain boundary 20 may be confirmed. Other methods and/or tools appreciated by one of ordinary skill in the art, even if not described in the present disclosure, may also be used.

In general, in order to realize high reliability characteristics, insulation resistance characteristics have been controlled by applying various additive elements to the fine base material and changing the interface and grain boundary resistance characteristics of the dielectric layer and the internal electrode layer. That is, in order to improve voltage-withstanding characteristics and reliability of the dielectric material, which is not sufficient when only the additive elements, such as a reduction resistance enhancing element to prevent oxidation of the internal electrode layer during the firing process, a fixed-valence acceptor to improve insulation properties, a rare earth element serving as a donor, and the fixed-valence acceptor, are added, the variable-valence acceptor is combined in an appropriate content, and then sintering aids are added to adjust their employing characteristics and sintering temperature. Most of these additive elements are doped into the dielectric material and are employed in the shell region of the $BaTiO_3$ base material grains to form a core-shell structure.

In contrast, the dielectric grains 10 in the dielectric layer 111 according to an embodiment do not have a special boundary portion separating the core and the shell, and are divided into the dielectric grains 10 and the grain boundaries 20. In the core-shell structure of existing crystal grains, the core region may be considered as a further expanded form of dielectric grains 10 according to an embodiment. In addition, in an embodiment, the portion corresponding to the shell region of the existing core-shell structure, which affects reliability improvement by employing various additive elements, is reduced, which may reduce the reliability within the grains, but due to the grain boundaries 20 including Si, Dy, and Tb, grain boundary reliability may be further strengthened.

In more detail, the diameter d of the dielectric grain 10 according to an embodiment may occupy 60% to 90%, for example, 70% to 90%, of a sum of the diameter d of the dielectric grain 10 and a thickness t of the grain boundary 20. For example, the diameter d of dielectric grain may be 80 nm to 120 nm, and for example, may be 85 nm to 115 nm. When the diameter d of the dielectric grain 10 is within the above range, the grain boundary reliability and the interface reliability may be high and voltage-withstanding characteristics may be excellent.

The diameter d of the dielectric grain 10 may confirmed by TEM analysis.

The cross-section sample may be obtained such that the active region where the dielectric layer 111 and the internal electrode layers 121 and 122 overlap may be observed, as the multilayer ceramic capacitor 100 is placed into an epoxy mixture liquid and cured, the W-axis and T-axis direction surface (WT surface) of the capacitor body 110 is polished to a depth of ½ in the L-axis direction, and then it is fixed and maintained in a vacuum atmosphere chamber. Subsequently, the active region of the cross-section sample may be measured by using transmission electron microscope (TEM). The transmission electron microscopy may be performed under the condition of acceleration voltage 200 kV and analysis magnification 225 k times by using focused ion beam (Xe-FIB), and may be measured such that at least one layer, for example 1 layer to 10 layers of the dielectric layer 111 may be visible. The diameter of the dielectric grain 10 may be obtained by measuring maximum major axes of at least one, for example, two to twenty, dielectric grains 10 from the TEM image of the cross-section sample and taking an average value thereof. Other methods and/or tools appreciated by one of ordinary skill in the art, even if not described in the present disclosure, may also be used.

Size D50 of the dielectric grain 10 may be 300 nm or less, and for example, may be 280 nm or less. When the size D50 of the dielectric grain 10 is within the above range, the grain boundary reliability and the interface reliability may be high and voltage-withstanding characteristics may be excellent.

The size D50 of the dielectric grain 10 measures maximum major axes of at least 100 dielectric grains in the transmission electron microscope (TEM) image of the cross-section sample, creates a size distribution accumulation curve, and calculate the D50. Other methods and/or tools appreciated by one of ordinary skill in the art, even if not described in the present disclosure, may also be used. D50 may mean a size at a point of 50% of the size distribution accumulation curve.

The thickness t of the grain boundary 20 may be 10 nm to 100 nm, and for example, may be 20 nm to 90 nm. When the thickness t of the grain boundary 20 is within the above range, the grain boundary reliability and the interface reliability may be high and voltage-withstanding characteristics may be excellent.

The thickness t of the grain boundary 20 may be an average value of thicknesses of the grain boundaries 20 at at least 10 points in the transmission electron microscope (TEM) image of the cross-section sample. Other methods and/or tools appreciated by one of ordinary skill in the art, even if not described in the present disclosure, may also be used.

An average thickness of the dielectric layer 111 according to an embodiment may be 0.3 μm to 0.6 μm, and for example, may be 0.35 μm to 0.55 μm. When the average thickness of the dielectric layer 111 is within the above range, a highly reliable thin-layer multilayer ceramic capacitor may be secured.

The average thickness of the dielectric layer 111 may be measured by scanning electron microscope (SEM) analysis, after the multilayer ceramic capacitor 100 is placed into an epoxy mixture liquid, and then curing it, polishing it, and then ion milling it. As the scanning electron microscope, for example, Verios G4 product from Thermo Fisher Scientific may be used, the measurement condition may be 10 kV, 0.2 nA, analysis magnification may be 100 times, and the measurement may be made such that at least 1 layer or more, 3 layers or more, 5 layers or more, or 10 layers or more dielectric layers 111 may be obtained. In the scanning electron microscope (SEM) image, the central point of the dielectric layer 111 in the length direction (L-axis direction) or the width direction (W-axis direction) is taken as a reference point, and an arithmetic average value of the thicknesses of the dielectric layer 111 may be obtained for 10 points disposed apart from the reference point by a predetermined interval. The intervals of the 10 points may be adjusted depending on the scale of the SEM image, and may be, for example, 1 μm to 100 μm, 1 μm to 50 μm, or 1 μm to 10 μm. At this time, all 10 points must be positioned within the dielectric layer 111, and if all 10 points are not positioned within the dielectric layer 111, the position of the reference point may be changed, or the interval between the 10 points may be adjusted. Other methods and/or tools appreciated by one of ordinary skill in the art, even if not described in the present disclosure, may also be used.

The first internal electrode 121 and the second internal electrode 122 are electrodes having different polarities, alternately arranged interposing the dielectric layer 111 to face each other along the T-axis direction, and may have a first end exposed through the third and fourth surfaces of the capacitor body 110, respectively.

The first internal electrode 121 and the second internal electrode 122 may be electrically insulated from each other by the dielectric layer 111 disposed in the middle.

End portions of the first internal electrode 121 and the second internal electrode 122 alternately exposed through the third and fourth surfaces of the capacitor body 110 may be electrically connected to the first external electrode 131 and the second external electrode 132, respectively.

The first internal electrode 121 and the second internal electrode 122 may include a conductive metal, for example, a metal such as Ni, Cu, Ag, Pd, Au, or an alloy thereof, such as an Ag—Pd alloy.

Additionally, the first internal electrode 121 and the second internal electrode 122 may include dielectric particles of the same composition as the ceramic material included in the dielectric layer 111.

The first internal electrode 121 and the second internal electrode 122 may be formed using a conductive paste including a conductive metal. The printing method of the conductive paste may be a screen printing method or a gravure printing method.

The average thickness of the first internal electrode 121 and the second internal electrode 122 may be 0.1 μm to 2 μm. The average thickness of the first internal electrode 121 and the second internal electrode 122 may be measured by the SEM analysis. Here, since the SEM analysis is the same as the method for measuring the average thickness of the dielectric layer 111 described above, a description thereof will be omitted.

The capacitor body 110 may be formed by firing a laminate in which the plurality of dielectric layers 111 and the internal electrode layers 121 and 122 are stacked.

The first external electrode 131 and the second external electrode 132 are provided with voltages of different polarities, and may be coupled and electrically connected to exposed portions of the first internal electrode 121 and the second internal electrode 122, respectively.

According to the above configuration, when a predetermined voltage is to the first external electrode 131 and the second external electrode 132, charges are accumulated between the first internal electrode 121 and the second internal electrode 122 facing each other. At this time, the capacitance of the multilayer ceramic capacitor 100 is proportional to the overlapping area of the first internal electrode 121 and the second internal electrode 122 that overlap each other along the T-axis direction in the active region.

The first external electrode 131 and the second external electrode 132 may include, respectively, first and second connection portions disposed on the third and fourth surfaces of the capacitor body 110 and connected to the first internal electrode 121 and the second internal electrode 122, and first and second band portions disposed on edges where the third and fourth surfaces of the capacitor body 110 meet the first and second surfaces or the fifth and sixth surfaces.

The first and second band portions may extend, respectively, from the first and second connection portions to portions of the first and second surfaces of the capacitor body 110 or the fifth and sixth surfaces. The first and second band portions may serve to improve the adhesion strength of the first external electrode 131 and the second external electrode 132.

Each of the first external electrode 131 and the second external electrode 132 may include a sintered metal layer in contact with the capacitor body 110, a conductive resin layer disposed to cover the sintered metal layer, and a plating layer disposed to cover the conductive resin layer.

The sintered metal layer may include a conductive metal and glass.

The conductive metal may include copper (Cu), nickel (Ni), silver (Ag), palladium (Pd), gold (Au), platinum (Pt), tin (Sn), tungsten (W), titanium (Ti), lead (Pb), an alloy thereof, or a combination thereof, and for example, copper (Cu) may include a copper (Cu) alloy. When the conductive metal includes copper, metals other than copper may be included in an amount of 5 parts by mole or less with respect to 100 parts by mole of copper.

The glass may include a composition of mixed oxides, for example, one or more selected from the group consisting of silicon oxide, boron oxide, aluminum oxide, transition metal oxide, alkali metal oxide, and alkaline earth metal oxide. The transition metal may be selected from a group consisting of zinc (Zn), titanium (Ti), copper (Cu), vanadium (V), manganese (Mn), iron (Fe)) and nickel (Ni), the alkali metal may be selected from a group consisting of lithium (Li), sodium (Na) and potassium (K), and the alkaline-earth metal may be at least one selected from a group consisting of magnesium (Mg), calcium (Ca), strontium (Sr) and barium (Ba).

Optionally, the conductive resin layer may be formed on the sintered metal layer, and for example, may be formed in the shape that completely covers the sintered metal layer. Meanwhile, the first external electrode 131 and the second external electrode 132 may not include the sintered metal layer, and in this case, the conductive resin layer may directly contact the capacitor body 110.

The conductive resin layer extends to the first and second surfaces or the fifth and sixth surfaces of the capacitor body 110, and the length of the region (i.e., band portion) where the conductive resin layer is extended and disposed to the first and second surfaces or the fifth and sixth surfaces of the capacitor body 110 may be longer than the length of the region (i.e., band portion) where the sintered metal layer are extended and disposed to the first and second surfaces or the fifth and sixth surfaces of the capacitor body 110. That is, the conductive resin layer may be formed on the sintered metal layer, and may be formed in the shape that completely covers the sintered metal layer.

The conductive resin layer may include resin and conductive metal.

The resin included in the conductive resin layer may be implemented by a material which has adhesive properties and shock absorption properties and is able to form a paste when mixed with the conductive metal powder, but is not limited thereto. For example, the resin may include phenolic resin, acrylic resin, silicone resin, epoxy resin, or polyimide resin.

The conductive metal included in the conductive resin layer serves to be electrically connected to the first internal electrode 121 and the second internal electrode 122 or the sintered metal layer.

The conductive metal included in the conductive resin layer may have a spherical shape, a flake shape, or a combination thereof. That is, the conductive metal may be formed only in flake form, only in spherical form, or in a mixed form of flake form and spherical form.

Here, the spherical shape may also include a shape that is not a perfect spherical shape, for example, a shape in which the length ratio of the major axis and the minor axis (major axis/minor axis) is 1.45 or less. Flake shape powder refers to a powder with a flat and elongated shape, and is not particularly limited. But for example, the length ratio of the major axis and the minor axis (major axis/minor axis) may be 1.95 or more.

The first external electrode 131 and the second external electrode 132 may further include the plating layer disposed outside the conductive resin layer.

The plating layer may include nickel (Ni), copper (Cu), tin (Sn), palladium (Pd), platinum (Pt), gold (Au), silver (Ag), tungsten (W), titanium (Ti), or lead (Pb), either alone or in an alloy thereof. For example, the plating layer may be a nickel (Ni) the plating layer or a tin (Sn) the plating layer, may be a form in which the nickel (Ni) the plating layer and the tin (Sn) the plating layer are sequentially stacked, or may be a form in which the tin (Sn) the plating layer, the nickel (Ni) the plating layer, and the tin (Sn) the plating layer are sequentially stacked. Additionally, the plating layer may include a plurality of nickel (Ni) the plating layers and/or a plurality of tin (Sn) the plating layers.

The plating layer may improve mountability to the substrate, structural reliability, durability to the outside, heat resistance, and equivalent series resistance (ESR) of the multilayer ceramic capacitor 100.

Hereinafter, a method of manufacturing the multilayer ceramic capacitor 100 according to an embodiment will be described.

A multilayer ceramic capacitor according to an embodiment 100 may be manufactured according to steps of preparing a dielectric slurry by mixing the barium titanate-based main component powder with the secondary component powder including silicon (Si)-containing compound, dysprosium (Dy)-containing compound, and terbium (Tb)-containing compound, preparing dielectric green sheet by using the dielectric slurry, and forming conductive paste layer on the dielectric green sheet surface, manufacturing a dielectric green sheet laminate by stacking the dielectric green sheet on which the conductive paste layer is formed, and manufacturing the capacitor body including a dielectric layer and an internal electrode layer by firing the dielectric green sheet laminate, and forming external electrode on the first surface of the capacitor body.

First, the dielectric slurry is prepared by mixing the barium titanate-based main component powder together with the secondary component powder including silicon (Si)-containing compound, dysprosium (Dy)-containing compound, and terbium (Tb)-containing compound.

The barium titanate-based main component powder may be prepared by mixing titanium (Ti) precursor and barium (Ba) precursor.

The titanium (Ti) precursor may be oxide, salt, alkoxide, or the like of titanium, and may include, for example, titanium dioxide, titanium diisopropoxide diacetyl acetonate (TPA), titanium alkoxide, or a combination thereof.

The barium (Ba) precursor may include $BaO_2$, BaTiOs, $BaCO_3$, BaO or a combination thereof.

The titanium (Ti) precursor and the barium (Ba) precursor may be mixed at a mole ratio of 1:0.5 to 1:1.5.

The secondary component powder, such as silicon (Si)-containing compound, dysprosium (Dy)-containing compound, and terbium (Tb)-containing compound may be oxide, nitride, or salt compounds, and may be used in the form of a sol dispersed in an organic solvent.

The silicon (Si)-containing compound may be included in an amount of 1.3 parts by mole to 2.5 parts by mole, for example 1.35 parts by mole to 2.40 parts by mole, based on 100 parts by mole of titanium (Ti). When the silicon (Si)-containing compound is used within the above content range, the interface reliability may be strengthened, and thereby density and thin-layer reliability of a multilayer ceramic capacitor may be improved.

The dysprosium (Dy)-containing compound may be included in an amount of 0.6 parts by mole to 1.6 parts by mole, for example 0.7 parts by mole to 1.5 parts by mole, based on 100 parts by mole of titanium (Ti). When the dysprosium (Dy)-containing compound is used within the above content range, the interface reliability may be strengthened, and thereby density and thin-layer reliability of a multilayer ceramic capacitor may be improved.

The terbium (Tb)-containing compound may be included in an amount of 0.1 parts by mole to 0.5 parts by mole, for example 0.20 parts by mole to 0.48 parts by mole, based on 100 parts by mole of titanium (Ti). When the terbium (Tb)-containing compound is used within the above content range, the interface reliability may be strengthened, and thereby density and thin-layer reliability of a multilayer ceramic capacitor may be improved.

The secondary component powder may further include tin (Sn)-containing compound (e.g., a fourth compound).

The tin (Sn)-containing compound may be included in an amount of 0.5 parts by mole to 2.5 parts by mole, 0.7 parts by mole to 2.3 parts by mole, based on 100 parts by mole of titanium (Ti). When the tin (Sn)-containing compound is used within the above content range, the interface reliability may be strengthened, and thereby density and thin-layer reliability of a multilayer ceramic capacitor may be improved.

Additionally, the dielectric slurry may be prepared by additionally mixing additives such as dispersants, binders, plasticizers, lubricants, and antistatic agents, and solvents.

The dispersant may include, for example, phosphoric acid ester-based dispersant, polycarboxylic acid-based dispersant or a combination thereof. The dispersant may be mixed in an amount of 0.1 part by weight to 5 parts by weight based on 100 parts by weight of the barium titanate-based main component powder, and for example, may be mixed in an amount of 0.3 parts by weight to 3 parts by weight. When the dispersant is mixed within the above content range, the dielectric slurry shows excellent dispersibility, and the amount of impurities included in the manufactured dielectric layer may be reduce.

The binder may be, for example, acryl resin, polyvinyl butyl resin, polyvinyl acetal resin, ethylcellulose resin, or the like. The binder may be added in an amount of 0.1 part by weight to 50 parts by weight, for example, 3 parts by weight to 30 parts by weight, based on 100 parts by weight of the barium titanate-based main component powder. When the binder is mixed within the above content range, the dielectric slurry shows excellent dispersibility, and the amount of impurities included in the manufactured dielectric layer may be reduce.

The plasticizer may be, for example, a phthalic acid-based compound such as dioctyl phthalate, benzyl butyl phthalate, dibutyl phthalate, dihexyl phthalate, di(2-ethylhexyl) phthalate, and di(2-ethylbutyl) phthalate; an adipic acid-based compound such as dihexyl adipate and di(2-ethylhexyl) adipate; a glycol-based compound such as ethylene glycol, diethylene glycol, and triethylene glycol; a glycol ester-based compound such as triethylene glycol dibutyrate, triethylene glycol di(2-ethylbutyrate), and triethylene glycol di(2-ethylhexanoate); and the like. The plasticizer may be added in an amount of 0.1 parts by weight to 20 parts by weight, for example, 1 parts by weight to 10 parts by weight, based on 100 parts by weight of the barium titanate-based main component powder. When the plasticizer is mixed within the above content range, the dielectric slurry shows excellent dispersibility, and the amount of impurities included in the manufactured dielectric layer may be reduce.

The solvent may be an aqueous solvent such as water; an alcohol-based solvent such as ethanol, methanol, benzyl alcohol, and methoxyethanol; a glycol-based solvent such as ethylene glycol and diethylene glycol; a ketone-based solvent such as acetone, methyl ethyl ketone, methyl isobutyl ketone, and cyclohexanone; an ester-based solvent such as butyl acetate, ethyl acetate, carbitol acetate, and butylcarbitol acetate; an ether-based solvent such as methyl cellosolve, ethyl cellosolve, butyl ether, and tetrahydrofuran; an aromatic-based solvent such as benzene, toluene, and xylene, or the like. The solvent may be, for example, an alcohol-based solvent or aromatic-based solvent, considering dissolubility or dispersibility of various additives included in the dielectric slurry. The solvent may be mixed in an amount of 50 parts by weight to 1000 parts by weight, for example, 100 parts by weight to 500 parts by weight, based on 100 parts by weight of the barium titanate-based main component powder. When the solvent is mixed within the above content range, the dielectric slurry components may be sufficiently mixed, and subsequent removal of the solvent is easy.

Barium titanate-based main ingredient powder and the secondary component powder may be mixed by using a wet ball mill or a stirred mill. When using the zirconia balls in the wet ball mill, a plurality of zirconia balls with a diameter of 0.1 mm to 10 mm may be used for wet mixing for 8 hours to 48 hours, or 10 hours to 24 hours.

The prepared the dielectric slurry is formed into a dielectric layer after firing.

As a method of molding the prepared the dielectric slurry into a sheet shape, a tape molding method such as a doctor blade method, a calender roll method, etc. may be used, for example, an on-roll molding coater with a head discharge method, and the dielectric green sheet may be obtained by drying the molded body afterward.

To form the conductive paste layer that becomes the internal electrode layer after firing, a conductive paste may be prepared by mixing a conductive powder made of a conductive metal or an alloy thereof, a binder, and a solvent. Additionally, barium titanate powder may be mixed together as a co-material if necessary. The co-material may act to suppress sintering of the conductive powder during the firing process. The conductive paste layer is formed by applying a conductive paste to the surface of the dielectric green sheet in a predetermined pattern using various printing methods such as screen printing or transfer methods.

The conductive powder may include nickel (Ni) or a nickel (Ni) alloy.

Next, the dielectric green sheet laminate is prepared by stacking a plurality of layers of the dielectric green sheets on which internal electrode patterns are formed, and then pressing the plurality of layers of the dielectric green sheets in the stacking direction. At this time, the dielectric green sheet and the internal electrode pattern may be stacked so that the dielectric green sheet is located on the upper and lower surfaces of the dielectric green sheet laminate in the stacking direction.

The step of cutting the prepared the dielectric green sheet laminate to a predetermined size by dicing or the like may optionally be performed.

Additionally, the dielectric green sheet laminate may be solidified and dried to remove plasticizers, etc., if necessary, and after solidified and dried, the dielectric green sheet laminate may be barrel polished using a horizontal centrifugal barrel machine, and the like. In barrel polishing, the dielectric green sheet laminate is placed into a barrel container with media and polishing liquid, and rotational motion or vibration is applied to the barrel container, thus unnecessary parts, such as burrs generated during cutting, may be polished. Additionally, after barrel polishing, the dielectric green sheet laminate may be washed with a cleaning solution such as water, and dried.

Subsequently, the capacitor body may be prepared after binder removal treatment and firing of the dielectric green sheet laminate.

The conditions for binder removal may be appropriately adjusted depending on the components of the dielectric layer or the internal electrode layer. For example, the rate of temperature rise during binder removal treatment may be 5° C./hour to 300° C./hour, the support temperature may be 180° C. to 400° C., and the temperature holding time may be 0.5 hour to 24 hours. The treatment atmosphere of the binder removal may be the air or a reducing atmosphere.

The conditions of the firing treatment may be appropriately adjusted depending on the main ingredient composition of the dielectric layer or the main ingredient composition of the internal electrode. For example, firing may be performed at a temperature of 1100° C. to 1400° C., and may be performed at a temperature of 1200° C. to 1350° C. Additionally, firing may be performed for 0.5 to 8 hours, for example, 1 to 3 hours. Additionally, firing may be performed in a reducing atmosphere, for example, in a humidified mixed gas of nitrogen and hydrogen. When the internal electrode includes nickel (Ni) or a nickel (Ni) alloy, the oxygen partial pressure in the firing sintering atmosphere may be $1.0\times10^{-14}$ MPa to $1.0\times10^{-10}$ MPa.

After firing, annealing may be performed as needed. Annealing is a treatment to reoxidize the dielectric layer, and annealing may be performed if firing is performed in a reducing atmosphere. The conditions of the annealing treatment may also be appropriately adjusted depending on the components of the dielectric layer. For example, the annealing temperature may be 950° C. to 1150° C., the time may be 0 to 20 hours, and the rate of temperature rise may be 50° C./hour to 500° C./hour. The annealing atmosphere may be a humidified nitrogen gas $N_2$ atmosphere, and the oxygen partial pressure may be $1.0\times10^{-9}$ MPa to $1.0\times10^{-5}$ MPa.

In binder removal treatment, firing treatment, or annealing treatment, for example, a wetter may be used to humidify nitrogen gas or mixed gas. In this case, the water temperature may be 5° C. to 75° C. The binder removal treatment, firing treatment, and annealing treatment may be performed sequentially or independently.

Optionally, surface treatment such as sand blasting, laser irradiation, barrel polishing, etc. may be performed on the third and fourth surfaces of the prepare the capacitor body 110. By performing this surface treatment, the ends of the first internal electrode and the second internal electrode may be exposed to the outermost surfaces of the third and fourth surfaces, and thus the electrical connection between the first external electrode and the second external electrode, and the first internal electrode and the second internal electrode may be improved, alloy portions may be easily formed.

Subsequently, the external electrode is formed on the first surface of the manufactured capacitor body 110.

As an example, a paste for forming the sintered metal layer may be applied and then sintered to form the sintered metal layer.

The paste for forming the sintered metal layer may include a conductive metal and glass. Since the description of the conductive metal and glass is the same as described above, repetitive description will be omitted. Additionally, the paste for forming the sintered metal layer may optionally include a binder, solvent, dispersant, plasticizer, oxide powder, and the like. The binder may be, for example, ethylcellulose, acrylic, butyral, etc., and the solvent may be, for example, an organic solvent or aqueous solvent such as terpineol, butylcarbitol, alcohol, methyl ethyl ketone, acetone, toluene, and the like.

Methods for applying the paste for forming the sintered metal layer on the outer surface of the capacitor body 110 may include various printing methods such as dip method and screen printing, application method using a dispenser, etc., and spraying method using spray. The paste for forming the sintered metal layer may be applied to at least the third and fourth surfaces of the capacitor body 110, and optionally applied to a part of the first, second, fifth, or the sixth surfaces on which the band portions of the first and second external electrodes are formed.

Thereafter, the capacitor body 110 applied with the paste for forming the sintered metal layer is dried, and sintered at a temperature of 700° C. to 1000° C. for 0.1 hour to 3 hours, to form the sintered metal layer.

Optionally, a paste for forming the conductive resin layer is applied on an outer surface of the obtained capacitor body 110 and then cured, to form the conductive resin layer.

The paste for forming the conductive resin layer may include a resin and, optionally, a conductive metal or a non-conductive filler. Since the description of the conductive metal and resin is the same as described above, repetitive description will be omitted. Additionally, the paste for forming the conductive resin layer may optionally include a binder, solvent, dispersant, plasticizer, oxide powder, and the like. The binder may be, for example, ethylcellulose, acrylic, butyral, etc., and the solvent may be an organic solvent or aqueous solvent such as terpineol, butylcarbitol, alcohol, methyl ethyl ketone, acetone, and toluene.

For example, the conductive resin layer may be formed by dipping the capacitor body 110 in the paste for forming the conductive resin layer and then curing it, or by printing the paste for forming the conductive resin layer on the surface of the capacitor body 110 by a screen printing method or a gravure printing method, or by applying the paste for forming the conductive resin layer to the surface of the capacitor body 110 and then curing it.

Next, the plating layer may be formed on the outside of the conductive resin layer.

For example, the plating layer may be formed by a plating method, sputtering, or electrolytic plating (electric deposition).

The above-described embodiments will be described in more detail through Examples below. However, the following examples are for illustrative purposes only and do not limit the scope of appended claims.

(Manufacturing of Multilayer Ceramic Capacitor)

Examples 1 to 13, Comparative Examples 1 and 2, and Reference Examples 1 to 6

The dielectric slurry was prepared by mixing barium titanate ($BaTiO_3$) main component powder prepared by mixing $BaCO_3$ powder and $TiO_2$ powder, and the secondary component powder of silicon dioxide ($SiO_2$), dysprosium oxide ($Dy_2O_3$), terbium oxide ($Tb_2O_3$), and tin oxide ($SnO_2$) in the composition of Table 1 below. At this time, each secondary component powder was mixed in an amount based on 100 parts by mole of the $TiO_2$ powder. At this time, mixing was performed by using zirconia ball ($ZrO_2$ ball) as a dispersion medium, in which ethanol/toluene and polyvinyl butyral (PVB) resin as a wet dispersant and binder are added together and mechanical milling was performed.

The dielectric green sheet was prepared by using a head discharge type on-roll forming coater on the manufactured dielectric slurry.

The dielectric green sheet laminate was manufactured by printing a conductive paste layer including nickel (Ni) on the surface of the dielectric green sheet, and stacking and pressurizing the dielectric green sheet (width×depth×height=3.2 mm×2.5 mm×2.5 mm) on which the conductive paste layer is formed.

The dielectric green sheet laminate was subjected to a plasticizing process at 400° C. or lower in a nitrogen atmosphere, and then fired at a firing temperature of 1300° C. or lower and a hydrogen concentration of 1.0% $H_2$ or lower.

Subsequently, a multilayer ceramic capacitor was manufactured through processes of the external electrode, plating, or the like.

TABLE 1

The unit is parts by mole based on 100 parts by mole of $TiO_2$.

| | $TiO_2$ | $Dy_2O_3$ | $Tb_2O_3$ | $SiO_2$ | ($SnO_2$) |
|---|---|---|---|---|---|
| Example 1 | 100 | 0.825 | 0.275 | 1.38 | — |
| Example 2 | 100 | 0.825 | 0.275 | 1.8 | — |
| Example 3 | 100 | 0.825 | 0.275 | 2.21 | — |
| Example 4 | 100 | 1.125 | 0.375 | 1.38 | — |
| Example 5 | 100 | 1.125 | 0.375 | 1.8 | — |
| Example 6 | 100 | 1.125 | 0.375 | 2.21 | — |
| Example 7 | 100 | 1.425 | 0.475 | 1.38 | — |
| Example 8 | 100 | 1.425 | 0.475 | 1.8 | — |
| Example 9 | 100 | 1.425 | 0.475 | 2.21 | — |
| Example 10 | 100 | 0.825 | 0.275 | 1.38 | 1 |
| Example 11 | 100 | 1.125 | 0.375 | 1.38 | 1 |
| Example 12 | 100 | 1.125 | 0.375 | 1.8 | 1.5 |
| Example 13 | 100 | 1.125 | 0.375 | 2.21 | 2 |
| Comparative Example 1 | 100 | 0.275 | 0.825 | 1.2 | — |
| Comparative Example 2 | 100 | 0.668 | 0.825 | 2.8 | — |

TABLE 1-continued

The unit is parts by mole based on 100 parts by mole of $TiO_2$.

| | $TiO_2$ | $Dy_2O_3$ | $Tb_2O_3$ | $SiO_2$ | ($SnO_2$) |
|---|---|---|---|---|---|
| Reference Example 1 | 100 | 0.825 | 0.275 | 2.8 | — |
| Reference Example 2 | 100 | 0.825 | 0.668 | 2.8 | — |
| Reference Example 3 | 100 | 1.125 | 0.375 | 2.8 | — |
| Reference Example 4 | 100 | 1.125 | 0.911 | 3 | — |
| Reference Example 5 | 100 | 1.425 | 0.475 | 2.8 | — |
| Reference Example 6 | 100 | 1.425 | 1.154 | 3 | — |

Evaluation 1: TEM-EDS Analysis

Figure 5A:
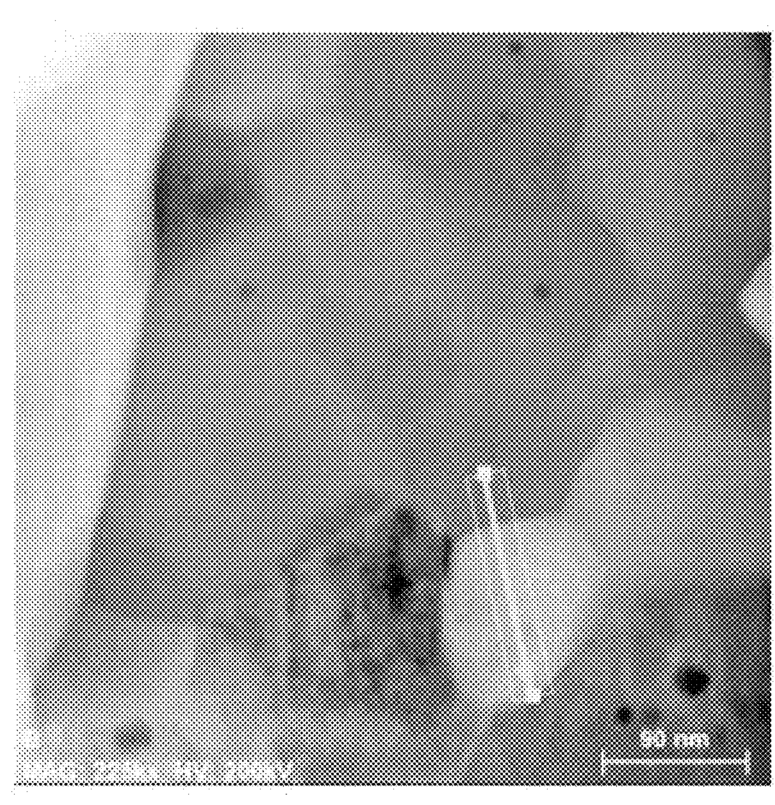
FIG. 5A is a TEM image of a portion of a dielectric layer according to Example 1.
Figure 5B:
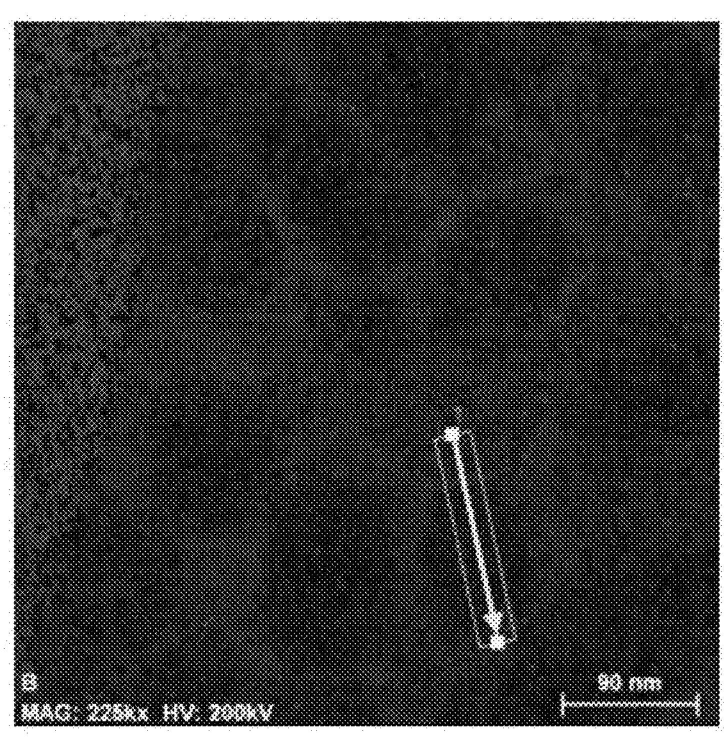
FIG. 5B is a TEM-EDS analysis image the portion of the dielectric layer in FIG. 5A.
Figure 5C:
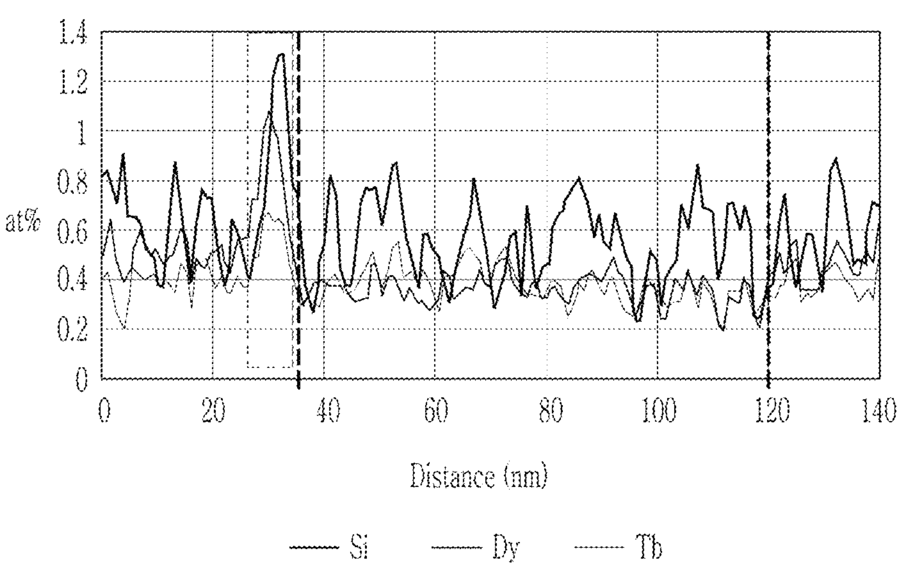
FIG. 5C is an EDS-line analysis graph of the portion indicated by the arrow in FIG. 5A.

Transmission electron microscope-energy dispersive spectroscopy (TEM-EDS) analysis was performed on the multilayer ceramic capacitor manufactured in Example 1, and the result is shown in FIGS. 5A to 5C and Table 2 below.

TEM-EDS analysis was obtained as follows. The cross-section sample was obtained such that the active region where the dielectric layer and the internal electrode layer overlap may be observed, as the multilayer ceramic capacitor manufactured in Example 1 was placed into an epoxy mixture liquid and cured, the W-axis and T-axis direction surface (WT surface) of the capacitor body 110 was polished to a depth of ½ in the L-axis direction, and then it was fixed and maintained in a vacuum atmosphere chamber. The active region of the cross-section sample was measured by using TEM. The TEM image was measured under the condition of acceleration voltage 200 kV and analysis magnification 225 k times by using focused ion beam (Xe-FIB) such that at least one layer of the dielectric layer may be visible.

Through the transmission electron microscope (TEM) image of the measured cross-section sample, the dielectric grain and grain boundary was confirmed (refer to FIG. 5A), and contents of Si, Dy, Tb, and Sn existing in the grain boundary was confirmed by EDS analysis on the TEM image (refer to FIGS. 5B and 5C).

FIG. 5A is a TEM image of a part of a dielectric layer according to Example 1. FIG. 5B is a TEM-EDS analysis image of the part of the dielectric layer in FIG. 5A. FIG. 5C is an EDS-line analysis graph of the portion indicated by the arrow in FIG. 5A.

Through the EDS-line analysis, in a portion indicated in FIG. 5B, that is, in a portion in which the dielectric grain and the grain boundary are all included, the atom % of each component was confirmed for the line section connected by a straight line from the start to the end.

In FIG. 5C, a region of about 25 nm to about 35 nm corresponds to the grain boundary, and a region of about 120 nm thereafter corresponds to the dielectric grain. Referring to FIG. 50, it may be confirmed that, in the grain boundaries within a dielectric layer according to an embodiment, the components of Tb, Dy, and Si exist in the content order of Tb<Dy<Si.

Evaluation 2: Permittivity

With respect to the multilayer ceramic capacitors manufactured in Examples 1 to 13, Comparative Examples 1 and 2, and Reference Examples 1 to 6, the dielectric constant (permittivity) was measured under the condition of 1 KHz and 0.5V, and the result is shown in Table 2 below.

Evaluation 3: Reliability

With respect to the multilayer ceramic capacitors manufactured in Examples 1 to 13, Comparative Examples 1 and 2, and Reference Examples 1 to 6, by performing measurement under the condition of temperature 125° C. and voltage 9.45V, average fail hour (hr), that is, a mean time to failure (MTTF), in which fail occurs, was obtained and the result is shown in Table 2 below.

In Table 2 below, ○ indicates an average fail hour of 10 hours or more, Δ indicates an average fail hour of 5 hours or more to less than 10 hours, and X indicates an average fail hour of less than 5 hours.

Evaluation 4: Density

With respect to the multilayer ceramic capacitors manufactured in Examples 1 to 14, Comparative Examples 1 and 2, and Reference Examples 1 to 9, the number of pores of the dielectric layer was confirmed by performing scanning electron microscope (SEM) analysis, and the result is shown in Table 2 below.

SEM analysis was performed as follows. The cross-section sample was obtained such that the active region where the dielectric layer and the internal electrode layer overlap may be observed, as the multilayer ceramic capacitors manufactured in Examples 1 to 14, Comparative Examples 1 and 2, and Reference Examples 1 to 9 was placed into an epoxy mixture liquid and cured, the W-axis and T-axis direction surface (WT surface) of the capacitor body was polished to the point of ½ in the L-axis direction, and then it was fixed and maintained in a vacuum atmosphere chamber. Subsequently, the measurement was made by scanning electron microscope (SEM) such that at least 3 layers of the dielectric layer in the size of about 2 μm×2 μm may be obtained in the active portion the cross-section sample. For example, a Verios G4 product of Thermo Fisher Scientific was used for the SEM, and the measurement condition was 10 kV, 0.2 nA.

In Table 2 below, ○ indicates that the number of observed pores is less than 5, Δ indicates that the number of observed pores is 5 or more to less than 10, and X indicates that the number of observed pores is 10 or more.

TABLE 2

The unit is parts by mole based on 100 parts by mole of titanium (Ti).

| | Components in grain boundary | | | | | Characteristics | | |
|---|---|---|---|---|---|---|---|---|
| | Ti | Dy | Tb | Si | Sn | Dielectric constant | MTTF | Density |
| Example 1 | 100 | 0.825 | 0.275 | 1.38 | — | 3600 | ○ | ○ |
| Example 2 | 100 | 0.825 | 0.275 | 1.8 | — | 3500 | ○ | ○ |
| Example 3 | 100 | 0.825 | 0.275 | 2.21 | — | 3400 | ○ | ○ |
| Example 4 | 100 | 1.125 | 0.375 | 1.38 | — | 3400 | ○ | ○ |
| Example 5 | 100 | 1.125 | 0.375 | 1.8 | — | 3300 | ○ | ○ |
| Example 6 | 100 | 1.125 | 0.375 | 2.21 | — | 3200 | ○ | ○ |
| Example 7 | 100 | 1.425 | 0.475 | 1.38 | | 3200 | ○ | ○ |
| Example 8 | 100 | 1.425 | 0.475 | 1.8 | — | 3100 | ○ | ○ |
| Example 9 | 100 | 1.425 | 0.475 | 2.21 | — | 3000 | ○ | ○ |
| Example 10 | 100 | 0.825 | 0.275 | 1.38 | 1 | 3300 | ○ | ○ |
| Example 11 | 100 | 1.125 | 0.375 | 1.38 | 1 | 3200 | ○ | ○ |
| Example 12 | 100 | 1.125 | 0.375 | 1.8 | 1.5 | 3100 | ○ | ○ |
| Example 13 | 100 | 1.125 | 0.375 | 2.21 | 2 | 3000 | ○ | ○ |
| Comparative Example 1 | 100 | 0.275 | 0.825 | 1.2 | — | X | X | X |
| Comparative Example 2 | 100 | 0.668 | 0.825 | 2.8 | — | X | X | X |
| Reference Example 1 | 100 | 0.825 | 0.275 | 2.8 | — | Δ | ○ | Δ |
| Reference Example 2 | 100 | 0.825 | 0.668 | 2.8 | — | Δ | X | Δ |
| Reference Example 3 | 100 | 1.125 | 0.375 | 2.8 | — | Δ | ○ | Δ |
| Reference Example 4 | 100 | 1.125 | 0.911 | 3 | — | Δ | X | Δ |
| Reference Example 5 | 100 | 1.425 | 0.475 | 2.8 | — | Δ | ○ | Δ |
| Reference Example 6 | 100 | 1.425 | 1.154 | 3 | — | Δ | X | Δ |

Through Table 2 below, in the case of Examples 1 to 13 in which components of Tb, Dy, and Si exist in the grain boundary within the dielectric layer in the content order of Tb<Dy<Si, it may be seen that dielectric constant, reliability, and density are all high compared to Comparative Examples 1 and 2 that do not satisfy the content sequence.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

What is claimed is:

1. A multilayer ceramic capacitor, comprising:

a capacitor body comprising a dielectric layer and an internal electrode layer; and an external electrode disposed outside the capacitor body, wherein the dielectric layer comprises a plurality of dielectric grains and a grain boundary located between dielectric grains adjacent to each other, wherein the plurality of dielectric grains comprises a barium titanate-based main component including barium (Ba) and titanium (Ti), wherein the grain boundary includes silicon (Si), dysprosium (Dy), and terbium (Tb), wherein a content of each of silicon (Si), dysprosium (Dy), and terbium (Tb) included in the grain boundary is in order of terbium (Tb)<dysprosium (Dy)<silicon (Si), and wherein a sum of the contents of dysprosium (Dy) and terbium (Tb) is greater than 0.9 parts by mole to less than 2.0 parts by mole based on 100 parts by mole of titanium (Ti).

2. The multilayer ceramic capacitor of claim 1, wherein silicon (Si) is included in an amount of 1.3 parts by mole to 2.5 parts by mole based on 100 parts by mole of titanium (Ti).

3. The multilayer ceramic capacitor of claim 1, wherein dysprosium (Dy) is included in an amount of 0.6 parts by mole to 1.6 parts by mole based on 100 parts by mole of titanium (Ti).

4. The multilayer ceramic capacitor of claim 1, wherein terbium (Tb) is included in an amount of 0.1 parts by mole to 0.5 parts by mole based on 100 parts by mole of titanium (Ti).

5. The multilayer ceramic capacitor of claim 1, wherein a mole ratio of terbium (Tb) to dysprosium (Dy) is 0.3 to 0.8.

6. The multilayer ceramic capacitor of claim 1, wherein an atomic ratio of dysprosium (Dy) to silicon (Si) is greater than 0.4 to less than 1.0.

7. The multilayer ceramic capacitor of claim 1, wherein an atomic ratio of terbium (Tb) to silicon (Si) is greater than 0.4 to less than 1.0.

8. The multilayer ceramic capacitor of claim 1, wherein the grain boundary further comprises tin (Sn).

9. The multilayer ceramic capacitor of claim 8, wherein tin (Sn) is included in an amount of 0.5 parts by mole to 2.5 parts by mole based on 100 parts by mole of titanium (Ti).

10. The multilayer ceramic capacitor of claim 1, wherein a dielectric grain among the plurality of dielectric grains has a diameter of 60% to 90% of a sum of a diameter of the dielectric grain and a thickness of the grain boundary.

11. The multilayer ceramic capacitor of claim 1, wherein a diameter of a dielectric grain among the plurality of dielectric grains is 80 nm to 120 nm.

12. The multilayer ceramic capacitor of claim 1, wherein a size D50 of the plurality of dielectric grains is 300 nm or less.

13. The multilayer ceramic capacitor of claim 1, wherein a thickness of the grain boundary is 10 nm to 100 nm.

14. The multilayer ceramic capacitor of claim 1, wherein an average thickness of the dielectric layer is 0.3 μm to 0.6 μm.

15. The multilayer ceramic capacitor of claim 1, wherein silicon (Si) is included in an amount of 1.3 parts by mole to 2.5 parts by mole based on 100 parts by mole of titanium (Ti), dysprosium (Dy) is included in an amount of 0.6 parts by mole to 1.6 parts by mole based on 100 parts by mole of titanium (Ti), and terbium (Tb) is included in an amount of 0.1 parts by mole to 0.5 parts by mole based on 100 parts by mole of titanium (Ti).

16. A manufacturing method of a multilayer ceramic capacitor, the manufacturing method comprising:

preparing a dielectric slurry by mixing barium titanate-based main component powder, and secondary component powder including silicon (Si)-containing compound, dysprosium (Dy)-containing compound, and terbium (Tb)-containing compound;

preparing a dielectric green sheet by utilizing the dielectric slurry, and forming a conductive paste layer on a surface of the dielectric green sheet;

manufacturing a dielectric green sheet laminate by stacking a plurality of the dielectric green sheets on which the conductive paste layer is formed;

manufacturing a capacitor body including a plurality of dielectric layers and a plurality of internal electrode layers by firing the dielectric green sheet laminate; and forming an external electrode on a first surface of the capacitor body, wherein the dielectric layer comprises a plurality of dielectric grains and a grain boundary located between dielectric grains adjacent to each other, wherein the plurality of dielectric grains comprises a barium titanate-based main component including barium (Ba) and titanium (Ti), wherein the grain boundary includes silicon (Si), dysprosium (Dy), and terbium (Tb), wherein a content of each of silicon (Si), dysprosium (Dy), and terbium (Tb) included in the grain boundary is in order of terbium (Tb)<dysprosium (Dy)<silicon (Si), and wherein the multilayer ceramic capacitor has a sum of the contents of dysprosium (Dy) and terbium (Tb) being greater than 0.9 parts by mole to less than 2.0 parts by mole based on 100 parts by mole of titanium (Ti).

17. The manufacturing method of claim 16, wherein the barium titanate-based main component powder is prepared by mixing titanium (Ti) precursor and barium (Ba) precursor, and wherein, based on 100 parts by mole of the titanium (Ti) precursor:

the silicon (Si)-containing compound is included in an amount of 1.3 parts by mole to 2.5 parts by mole;

the dysprosium (Dy)-containing compound is included in an amount of 0.6 parts by mole to 1.6 parts by mole; and the terbium (Tb)-containing compound is included in an amount of 0.1 parts by mole to 0.5 parts by mole.

18. The manufacturing method of claim 16, wherein the secondary component powder further comprises a fourth compound including tin (Sn).

19. The manufacturing method of claim 18, wherein:

the barium titanate-based main component powder is prepared by mixing titanium (Ti) precursor and barium (Ba) precursor; and the fourth compound is included in an amount of 0.5 parts by mole to 2.5 parts by mole based on 100 parts by mole of the titanium (Ti) precursor.

20. A multilayer ceramic capacitor, comprising:

a capacitor body comprising a dielectric layer and an internal electrode layer; and an external electrode disposed outside the capacitor body, wherein the dielectric layer comprises a plurality of dielectric grains and a grain boundary located between dielectric grains adjacent to each other, wherein the plurality of dielectric grains comprises a barium titanate-based main component including barium (Ba) and titanium (Ti), wherein the grain boundary includes silicon (Si), dysprosium (Dy), and terbium (Tb), wherein a content of each of silicon (Si), dysprosium (Dy), and terbium (Tb) included in the grain boundary is in order of terbium (Tb)<dysprosium (Dy)<silicon (Si), and wherein dysprosium (Dy) is included in an amount of 0.6 parts by mole to 1.6 parts by mole based on 100 parts by mole of titanium (Ti).

* * * * *